(12) United States Patent
Kaneko

(10) Patent No.: US 11,286,889 B2
(45) Date of Patent: Mar. 29, 2022

(54) EVAPORATIVE FUEL TREATMENT DEVICE

(71) Applicant: DENSO CORPORATION, Kariya (JP)

(72) Inventor: Makoto Kaneko, Kariya (JP)

(73) Assignee: DENSO CORPORATION, Kariya (JP)

( * ) Notice: Subject to any disclaimer, the term of this patent is extended or adjusted under 35 U.S.C. 154(b) by 306 days.

(21) Appl. No.: 16/710,579

(22) Filed: Dec. 11, 2019

(65) Prior Publication Data

US 2020/0191098 A1  Jun. 18, 2020

(30) Foreign Application Priority Data

Dec. 13, 2018  (JP) .............................. JP2018-233040

(51) Int. Cl.
*F02M 25/08* (2006.01)
*B60K 15/03* (2006.01)
*G01M 3/32* (2006.01)

(52) U.S. Cl.
CPC ......... *F02M 25/0818* (2013.01); *B60K 15/03* (2013.01); *F02M 25/0836* (2013.01); *F02M 25/0854* (2013.01); *G01M 3/3272* (2013.01); *B60K 2015/0321* (2013.01)

(58) Field of Classification Search
CPC .......... F02M 25/0818; F02M 25/0836; F02M 25/0854; B60K 15/03; B60K 2015/0321; B60K 2015/03514; B60K 2015/03585; B60K 15/035; B60K 15/03504; B60K 15/03519; G01M 3/3272
See application file for complete search history.

(56) References Cited

U.S. PATENT DOCUMENTS

| 9,458,801 | B2 * | 10/2016 | Dudar ................ F02M 25/0809 |
| 2015/0013437 | A1 * | 1/2015 | Takakura ........... F02M 25/0818 |
| | | | 73/40.5 R |

* cited by examiner

*Primary Examiner* — Xiao En Mo
(74) *Attorney, Agent, or Firm* — Nixon & Vanderhye P.C.

(57) ABSTRACT

In an evaporative fuel treatment device, a differential pressure specifying unit specifies a differential pressure between a pressure in a diagnosis target system and the atmosphere, and a pressure target setting unit sets a pressure target value so that the differential pressure attains a predetermined differential pressure value. A pump pressurizes or depressurizes the pressure in the diagnosis target system to the pressure target value, and a leakage diagnosis unit performs a leakage diagnosis based on a pressure change relation value related to the pressure change in the diagnosis target system and the leakage diagnosis threshold value. The fuel partial pressure estimation unit estimates a first partial pressure of fuel vapor in the fuel tank from a tank inside concentration and a tank absolute pressure of a specific component. A corresponding partial pressure specifying unit specifies a second partial pressure of the fuel vapor in the fuel tank based on a relation between the tank absolute pressure and the first partial pressure when the second partial pressure of the fuel vapor in the fuel tank when the pressure is increased or reduced to the target pressure value. A comparison unit compares the first partial pressure and the second partial pressure. A correction unit corrects, based on a comparison result of the comparison unit, a leakage diagnosis threshold value or the pressure change relation value used for the leakage diagnosis.

14 Claims, 7 Drawing Sheets

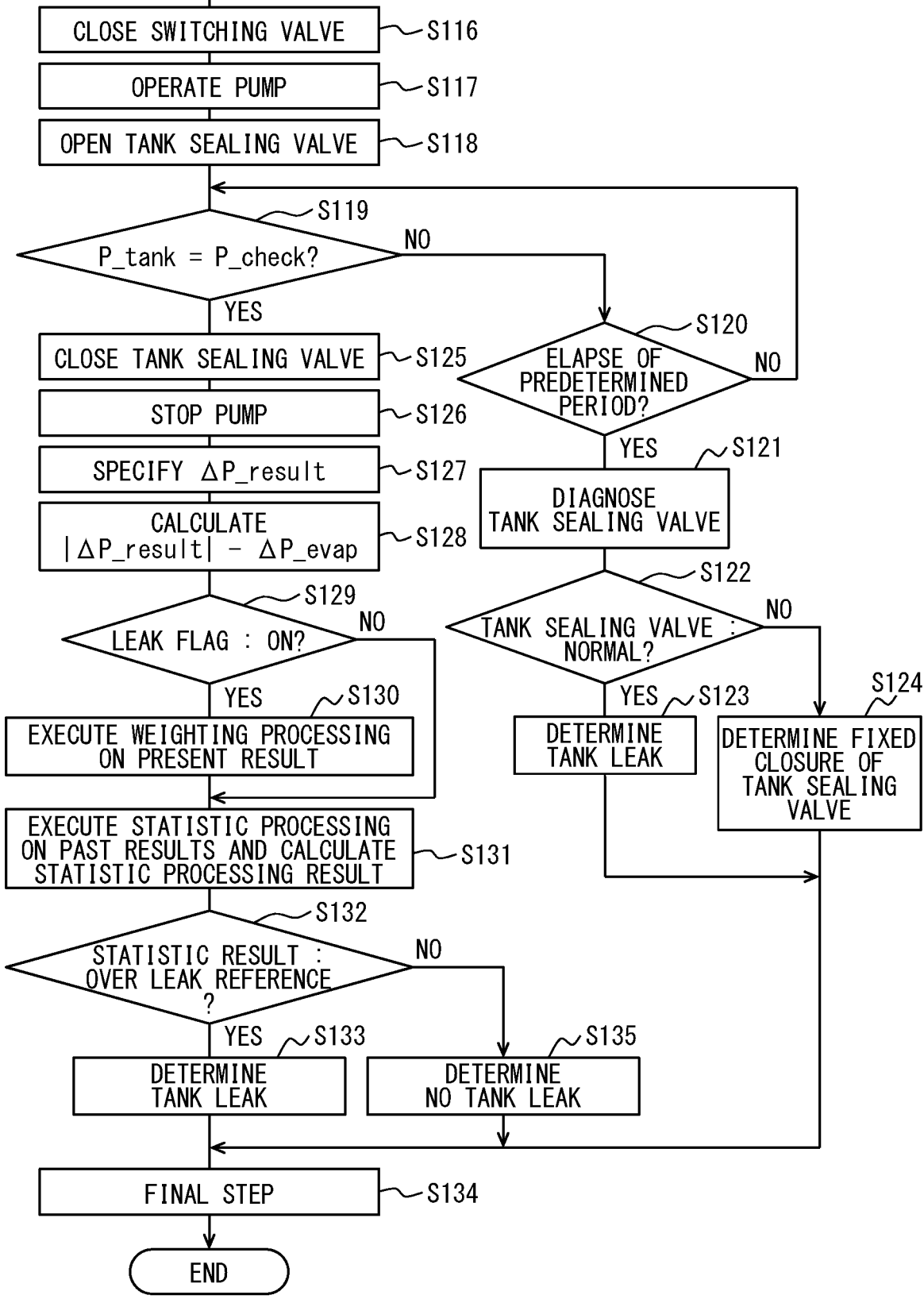

EVAPORATIVE FUEL TREATMENT DEVICE

CROSS REFERENCE TO RELATED APPLICATION

The present application claims the benefit of priority from Japanese Patent Application No. 2018-233040 filed on Dec. 13, 2018. The entire disclosures of the above application are incorporated herein by reference.

FIELD

The present disclosure relates to an evaporative fuel treatment device.

BACKGROUND

In a conventional evaporative fuel treatment device that treats evaporative fuel evaporated in a fuel tank of an internal combustion engine, a diagnosis device is proposed to diagnose leakage of a system including a fuel tank.

The diagnosis device for the evaporative fuel treatment device checks a change in internal pressure of a diagnosis target system after pressurizing the diagnosis target system including a fuel tank and a canister, and diagnoses leakage of the diagnosis target system based on the change in the internal pressure. As sensors for detecting the change in the internal pressure of the diagnosis target system, a tank pressure sensor and an evaporation pressure sensor are provided. The tank pressure sensor is provided in the fuel tank. The evaporation pressure sensor is provided in a purge passage connected to the canister. In addition, a tank sealing valve is provided in a passage connecting the fuel tank and the canister. With this configuration, in the diagnosis target system, internal pressures of a fuel tank side area and a canister side region with respect to the tank sealing valve are detected, thereby making it easy to identify the area of any leak occurring in the diagnosis target system.

SUMMARY

A leakage diagnosis device is provided for an evaporative fuel treatment device, which includes a fuel tank that stores fuel of an internal combustion engine, a canister that adsorbs evaporative fuel evaporated in the fuel tank, a tank sealing valve that switches between allowing and blocking communication between the fuel tank and the canister, and a pump that regulates a pressure in a diagnosis target system including the fuel tank to a pressure target value. The leakage diagnosis device comprises an electronic control unit configured to perform a leakage diagnosis in the diagnosis target system based on a pressure change relation value, which is related to a pressure change in the diagnosis target system, and a predetermined leakage diagnosis threshold value.

BRIEF DESCRIPTION OF THE DRAWINGS

FIG. 7 is a flowchart of the other part of the leakage diagnosis in the second embodiment.

DETAILED DESCRIPTION OF THE EMBODIMENT

Figure 1:
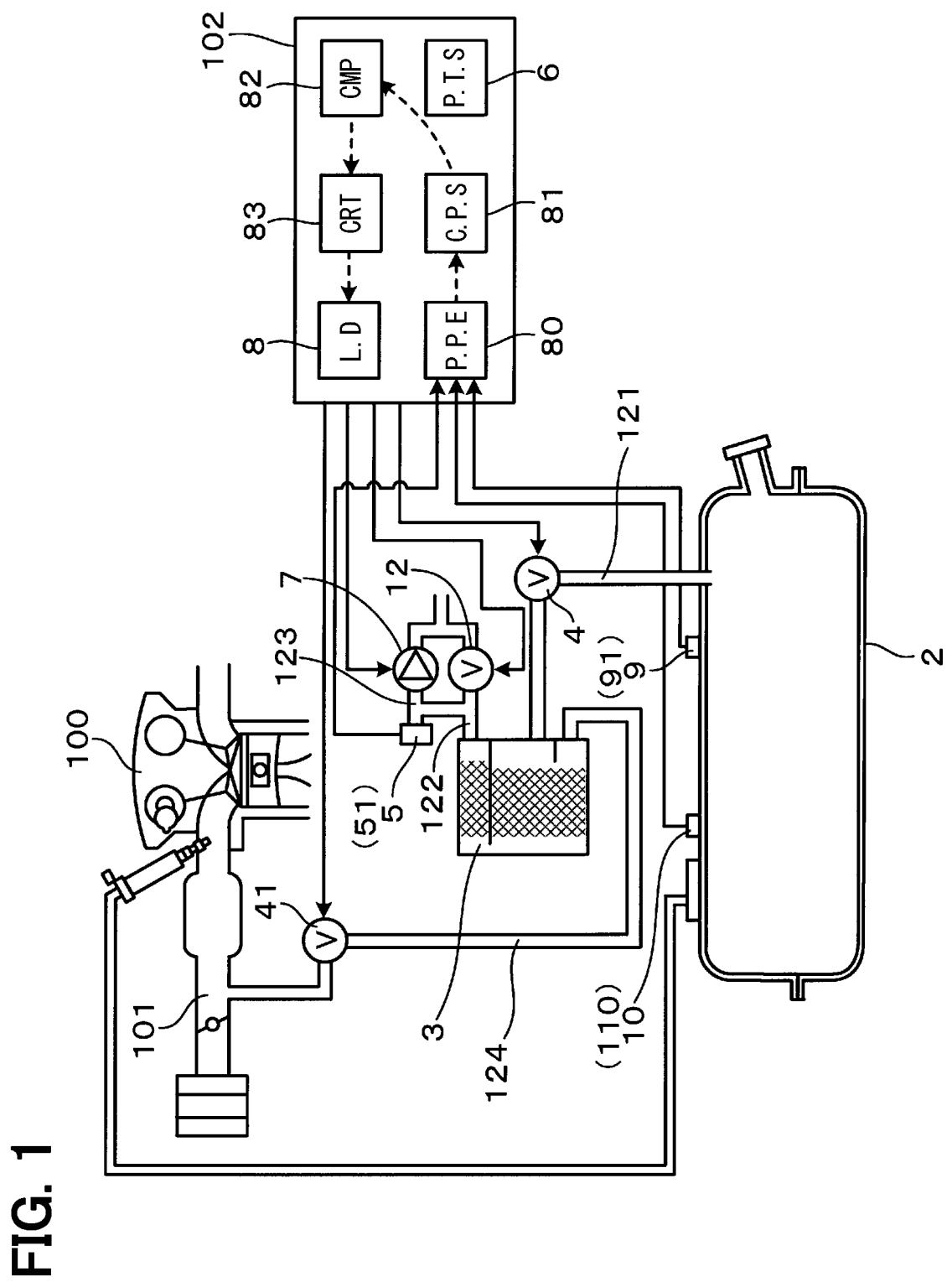
FIG. 1 is a schematic view showing a configuration of an evaporative fuel treatment device according to a first embodiment.

An evaporative fuel treatment device described below is configured to perform fuel leakage diagnosis in consideration of a state change of evaporation and liquefaction of fuel in a fuel tank to improve accuracy in the fuel leakage diagnosis.

First Embodiment

An evaporative fuel treatment device according to a first embodiment will be described with reference to FIGS. 1 and 2.

An evaporative fuel treatment device 1 of the present embodiment is configured to collect evaporative fuel from a fuel tank 2 of an internal combustion engine 100. The evaporative fuel treatment device 1 includes, in addition to the fuel tank 2, a canister 3, a tank sealing valve 4, a differential pressure specifying unit 5, a pressure target setting unit (P.T.S) 6, a pump 7, a leakage diagnosis unit (L.D) 8, a concentration specifying unit 9, a tank absolute pressure specifying unit 10, a fuel partial pressure estimation unit (P.P.E) 80, a corresponding partial pressure specifying unit (C.P.S) 81, a comparison unit (CMP) 82 and a correction unit (CRT) 83.

The fuel tank 2 stores fuel therein.

The canister 3 adsorbs evaporative fuel evaporated in the fuel tank 2.

The tank sealing valve 4 switches between allowing and blocking communication between the fuel tank 2 and the canister 3.

The differential pressure specifying unit 5 is configured to specify a differential pressure $\Delta P$, which is a difference between an inside pressure of a diagnosis target system including the fuel tank 2, and an atmospheric pressure, which is an outside pressure of the diagnosis target system.

The pressure target setting unit 6 is configured to set a pressure target value P_check in the diagnosis target system so that the differential pressure $\Delta P$ becomes a predetermined differential pressure target value $\Delta P\_target$.

The pump 7 increases or decreases the pressure in the diagnosis target system including the fuel tank 2 to the pressure target value P_check.

The leakage diagnosis unit 8 is configured to perform a leakage diagnosis in the diagnosis target system based on a pressure change relation value B, which is related to a pressure change in the diagnosis target system, and a predetermined leakage diagnosis threshold value A provided as a reference for comparison with the pressure change relation value.

The concentration specifying unit 9 is configured to specify an in-tank concentration d_X of a specific component in a gas phase portion in the fuel tank 2.

The tank absolute pressure specifying unit 10 is configured to specify a tank absolute pressure P_tank in the gas phase portion in the fuel tank 2.

The fuel partial pressure estimation unit 80 is configured to estimate a first partial pressure P_fuel1 of fuel vapor in the fuel tank 2 based on the in-tank concentration d_X and the tank absolute pressure P_tank.

The corresponding partial pressure specifying unit 81 is configured to specify, based on a relationship between the tank absolute pressure P_tank and the first partial pressure P_fuel1, a second partial pressure P_fuel2 of the fuel vapor when the tank pressure of the fuel tank 2 is increased or decreased to the pressure target value P_check.

The comparison unit 82 is configured to compare the first partial pressure P_fuel1 and the second partial pressure P_fuel2.

The correction unit 83 is configured to correct the leakage diagnosis threshold value A or the pressure change relation value B based on a comparison result of the comparison unit 82.

Hereinafter, the evaporative fuel treatment device 1 of the present embodiment will be described in detail.

As shown in FIG. 1, the fuel tank 2 and the canister 3 are connected to each other via an evaporative fuel passage 121. That is, the evaporative fuel evaporated in the fuel tank 2 reaches the canister 3 through the evaporative fuel passage 121 connected to a top of the fuel tank 2. The tank sealing valve 4 is provided in the evaporative fuel passage 121. The communication state of the tank sealing valve 4 is controlled by an ECU 102 provided for controlling the internal combustion engine 100.

As shown in FIG. 1, a purge passage 124 is connected to the canister 3. The purge passage 124 communicates the canister 3 and an intake system 101 of the internal combustion engine 100. The purge passage 124 is provided with a purge valve 41. The purge valve 41 is configured to turn on and off to control supply of the evaporative fuel from the canister 3 to the intake system 101 by opening and closing the purge passage 124.

A vent passage 122 is connected to the canister 3 for introducing atmospheric air. A switching valve 12 is provided in the vent passage 122. The vent passage 122 is provided with a bypass passage 123 which bypasses the switching valve 12. The bypass passage 123 is provided with the pump 7 and a check valve (not shown).

The differential pressure specifying unit 5 specifies the differential pressure ΔP between the atmospheric pressure and the inside pressure of the diagnosis target system including the fuel tank 2. The differential pressure specifying unit 5 specifies the differential pressure ΔP by detecting an atmospheric pressure P_atm and the tank absolute pressure P_tank in the fuel tank 2 and calculating a difference between the two detected pressures, or by detecting the differential pressure by a relative pressure sensor that detects the differential pressure ΔP between the atmospheric pressure P_atm and the tank absolute pressure P_tank. In the present embodiment, the differential pressure specifying unit 5 includes an atmospheric pressure sensor 51 that detects the atmospheric pressure P_atm. The pressure difference relative to the tank absolute pressure P_tank detected by the tank pressure sensor 110 is calculated as described later. In the present embodiment, the atmospheric pressure sensor 51 is configured to measure the atmospheric pressure P_atm at least when the pump 7 is stopped. The pressure target setting unit 6 sets the pressure target value P_check in the diagnosis target system so that the differential pressure ΔP between the pressures of inside and outside of the diagnosis target system becomes the predetermined differential pressure target value ΔP_target. The differential pressure target value ΔP_target is stored in advance in a storage unit including a memory (not shown) provided in the ECU 102.

The pump 7 pressurizes or depressurizes the fuel tank 2 so that the pressure in the tank 2 attains the pressure target value P_check. The pump 7 may be either a pressure pump or a pressure reduction pump. In this embodiment, the pump 7 is configured to discharge gas from the canister 3 to the atmosphere side using the pressure reduction pump.

As shown in FIG. 1, the fuel tank 2 is provided with the concentration specifying unit 9. The specific component to be detected by the concentration specifying unit 9 may be a component contained in the evaporative fuel of the fuel stored in the fuel tank 2. In case that gasoline is used as the fuel, hydrocarbon or the like is exemplified as the specific component to be detected. In case alcohol fuel is used as the fuel, ethanol, methanol or the like is exemplified as the specific component. The concentration specifying unit 9 may detect an oxygen concentration in the fuel tank 2, calculate an air concentration in the fuel tank 2 based on the oxygen concentration, and detect the in-tank concentration d_X of the specific component. The concentration specifying unit 9 includes a sensor capable of detecting the specific component. In the present embodiment, gasoline is used as the fuel, and the concentration specifying unit 9 includes an HC sensor 91 that detects a hydrocarbon concentration d_HC as the in-tank concentration d_X of the specific component. In the present embodiment, the HC sensor 91 is attached to the fuel tank 2.

As shown in FIG. 1, the fuel tank 2 is provided with the tank absolute pressure specifying unit 10. In the present embodiment, the tank absolute pressure specifying unit 10 includes a tank pressure sensor 110 that detects a tank absolute pressure P_tank that is an absolute pressure in the fuel tank 2. Alternatively, the tank absolute pressure specifying unit 10 may specify the tank absolute pressure P_tank by using in combination a relative pressure sensor, which detects a differential pressure between the pressure in the fuel tank 2 and the atmospheric pressure P_atm, and the atmospheric pressure sensor 51 that detects the atmospheric pressure P_atm.

The fuel partial pressure estimation unit 80, the corresponding partial pressure identification unit 81, the comparison unit 82 and the correction unit 83 of the ECU 102 shown in FIG. 1 are provided as software programs that perform their respective functions, and are executed by a processor such as a microcomputer of the ECU 102 as described later.

The fuel partial pressure estimating unit 80 estimates by calculation the first partial pressure P_fuel1 of the fuel vapor in the fuel tank 2 from the in-tank concentration d_X of the specific component specified by the concentration specifying unit 9 and the tank absolute pressure P_tank detected by the tank absolute pressure specifying unit 10. The estimation method is not particularly limited, and a known method can be adopted. In the present embodiment, the first partial pressure P_fuel1 is estimated by the following relational equation (1) established in the sealed fuel tank 2. The HC density d_HC is used as the in-tank concentration d_X.

$$P\_fuel1 = (N\_fuel)(P\_fuel1 + P\_air)/(N\_fuel + N\_air) \quad (1)$$
$$= (N\_fuel)(P\_tank)/(N\_tank)$$
$$= (d\_HC)(P\_tank)$$

Pfuel1: Partial pressure of evaporative fuel in fuel tank
P_air: Partial pressure of air in fuel tank
P_tank: Absolute pressure in fuel tank N_fuel: Mol number (number of mols) of evaporative fuel in fuel tank N_air: Mol number of air in fuel tank N_tank: Mol number of all gases in fuel tank dHC: Concentration of hydrocarbon in fuel tank The corresponding partial pressure specifying unit 81 shown in FIG. 1 specifies the second partial pressure P_fuel2 of the evaporative fuel from the pressure target value P_check based on the relationship between the first partial pressure P_fuel1 and the tank absolute pressure P_tank. For example, the following relational equation (2) is established, assuming that the first partial pressure P_fuel1 is close to a saturation vapor pressure, a flow rate of fuel evaporation and liquefaction from the start of pressure reduction to1 reaching the pressure target value P_check is sufficiently small relative to a flow rate of the pump, and a flow rate of air and evaporative fuel flowing in and out through a leak hole from the start of pressure reduction to reaching the pressure target value P_check is sufficiently small relative to the flow rate of the pump.

$$P\_tank P:\text{fuel1} = P\_check : P\_fuel2 \quad (2)$$

In the present embodiment, the corresponding partial pressure specifying unit 81 specifies the second partial pressure P_fuel2 based on the relational equation (2) from the tank absolute pressure P_tank and the first partial pressure P_fuel1.

The comparison unit 82 shown in FIG. 1 compares the first partial pressure P_fuel1 and the second partial pressure P_fuel2. In the present embodiment, the comparison unit 82 calculates a difference $\Delta P\_evap$ between the first partial pressure P_fuel1 and the second partial pressure P_fuel2. That is, the relational equation (3) is established as follows.

$$\Delta P\_evap = (P\_\text{fuel1}) - (P\_\text{fuel2}).$$

The difference $\Delta P\_evap$ corresponds to the tank internal pressure which is changeable because of evaporation of fuel in the fuel tank 2. This pressure difference is caused during a predetermined period from immediately after the fuel tank 2 is sealed after the internal pressure of the fuel tank 2 is set to the pressure target value P_check by operating the pump 7.

The correction unit 83 shown in FIG. 1 corrects the predetermined leakage diagnosis threshold value A or the pressure change relation value B related to the pressure change in the diagnosis target system including the fuel tank 2. The leakage diagnosis threshold value A is stored in the storage unit including the memory (not shown). The correction is executed by the correction unit 83 based on the comparison result in the comparison unit 82. For example, correction may be made by adding or subtracting a correction value to or from the leakage diagnosis threshold A or the pressure change relation value B by using the comparison result of the comparison unit 82 as the correction value.

The leakage diagnosis threshold value A is a predetermined value. For example, the leakage diagnosis threshold value A may be set to a pressure change amount $\Delta P\_leak$ in the fuel tank 2 which occurs immediately after the fuel tank 2 is sealed until a predetermined period elapses, a period T_leak until the pressure change amount in the fuel tank 2 reaches a predetermined value or a pressure change speed dp/dt_leak in the fuel tank 2.

In case that the leakage diagnosis threshold value A is the pressure change amount $\Delta P\_leak$, the pressure change amount $\Delta P\_result$ in the fuel tank 2 or the absolute value thereof is set as the pressure change relation value B, and the difference $\Delta P\_evap$, which is the comparison result of the comparison unit 82 is set as the correction value. Thus, the correction unit 83 corrects the pressure change relation value B by subtracting the correction value from the pressure change relation value B. Alternatively, the correction unit 83 may correct the leakage diagnosis threshold value A by adding the correction value to the leakage diagnosis threshold value A. In the above correction, the pressure change relation value B or the leakage diagnosis threshold value A may be corrected by using a difference $\Delta P'\_evap$ derived from the difference $\Delta P\_evap$ as a modified correction value in place of the difference $\Delta P\_evap$. The difference $\Delta P'\_evap$ as the modified correction value may be derived, for example, by multiplying the difference $\Delta P\_evap$ by a predetermined coefficient N that satisfies $0 < N \leq 1$.

In case that the leakage diagnosis threshold value A is a period T_leak, the correction unit 83 corrects the pressure change relation value B or the leakage diagnosis threshold value A in the similar manner as described above, by using the period T_result which elapses until the pressure change amount in the fuel tank 2 reaches the predetermined value as the pressure change relation value B and using a fluctuation period T_evap corresponding to the change amount of the tank internal pressure corresponding to the difference $\Delta P\_evap$ as the correction value. In case that the leakage diagnosis threshold value A is the pressure change speed dp/dt_leak, the correction unit 83 corrects the pressure change relation value B or the leakage diagnosis threshold value A in the similar manner as described above, by using the pressure change speed dp/dt_result in the fuel tank 2 as the pressure change relation value B, and using the pressure change speed dp/dt_evap in the fuel tank 2 corresponding to the difference $\Delta P\_evap$ as the correction value. In any case, the correction unit 83 may correct the pressure change relation value B or the leakage diagnosis threshold value A by using the modified correction value as described above.

The leakage diagnosis unit 8 diagnoses the leak in the diagnosis target system based on the pressure change relation value B related to a change in the tank internal pressure, which occurs after pressurizing or depressurizing the diagnosis target system by the pump 7 and the predetermined leakage diagnosis threshold value A. In case that the correction is made by the correction unit 83, the leakage diagnosis unit 8 performs the leakage diagnosis based on the corrected value. The leakage diagnosis method is not limited. For example, the leakage diagnosis may be performed by comparing the pressure change relation value B related to the change in the tank internal pressure with the leakage diagnosis threshold value A and checking whether an inequality B<A is satisfied.

Leakage diagnosis processing will be described with reference to flowcharts of FIGS. 2 and 3 executed by the ECU 102 and a time chart of FIG. 4.

Figure 2:
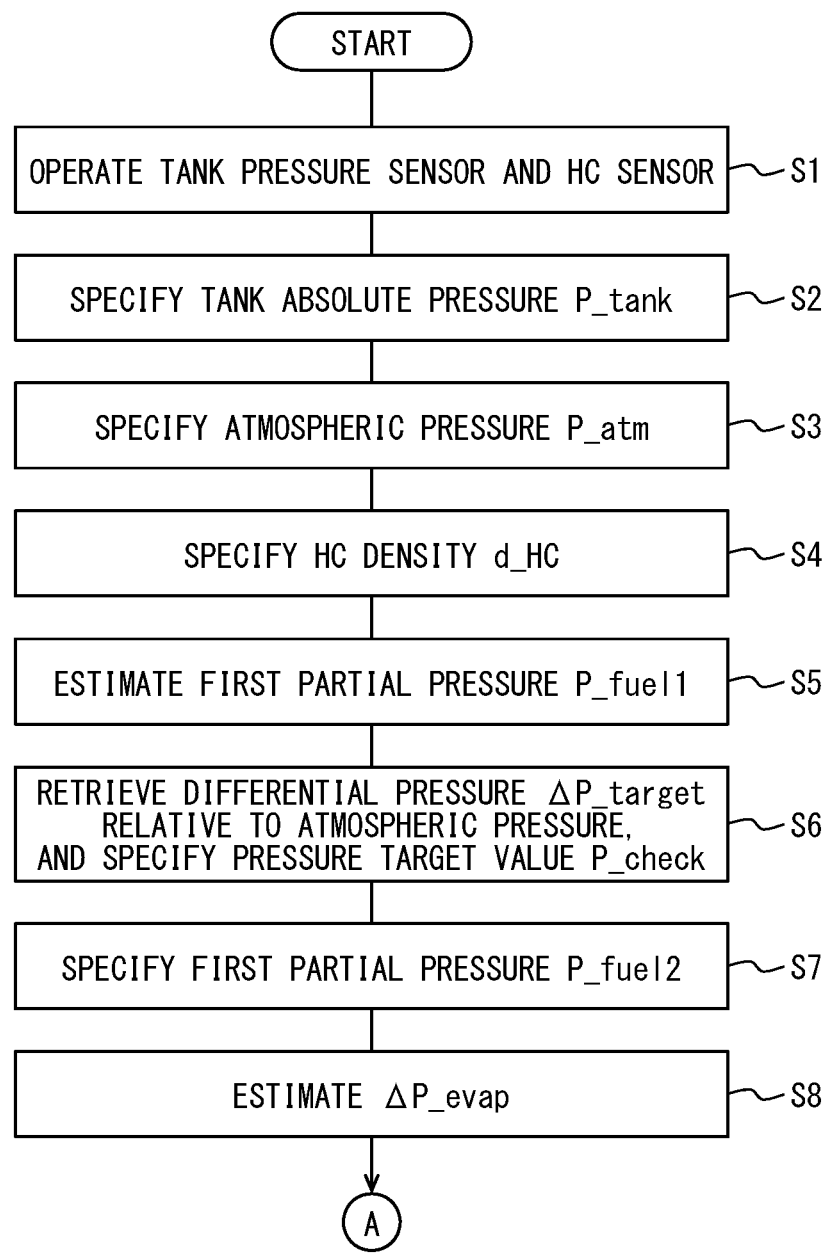
FIG. 2 is a flowchart of a part of a leakage diagnosis in the first embodiment.

First, in step S1 shown in FIG. 2, the HC sensor 91 as the concentration specifying unit 9 and the tank pressure sensor 110 as the tank absolute pressure specifying unit 10 are operated. In step S2, the tank absolute pressure P_tank in the tank 2 is specified by the tank absolute pressure specifying unit 10. In step S3, the atmospheric pressure P_atm is detected by the atmospheric pressure sensor 51. Subsequently, in step S4, the HC concentration d_HC in the fuel tank 2 is specified by the concentration specifying unit 9. The tank absolute pressure P_tank, the atmospheric pressure P_atm and the HC concentration d_HC specified as described above are retrieved into ECU 102.

Thereafter, in step S5, the first partial pressure P_fuel1 of the evaporative fuel in the fuel tank 2 is estimated by the fuel partial pressure estimation unit 80 based on the tank absolute pressure P_tank and the HC concentration d_HC.

In step S6, the differential pressure target value ΔP_target that is the target value of the differential pressure ΔP relative to the atmospheric pressure P_atm is retrieved by the pressure target setting unit 6, and the pressure target value P_check is specified from the differential pressure target value ΔP_target and the atmospheric pressure P_atm.

Next, in step S7, the second partial pressure P_fuel2 of the evaporative fuel at the time of decreasing the pressure to the pressure target value P_check is specified by the corresponding partial pressure specifying unit 81 based on the relationship between the first partial pressure P_fuel1 and the tank absolute pressure P_tank. In the present embodiment, the second partial pressure P_fuel2 is specified from the relation defined by the above equation (2), that is, P_tank: P_fuel1=P_check:P_fuel2.

Thereafter, in step S8, ΔP_evap is estimated. ΔP_evap is estimated by comparing the first partial pressure P_fuel1 and the second partial pressure P_fuel2 by the comparison unit 82. In the present embodiment, the difference ΔP_evap is calculated as the correction value based on the relational equation (3), that is, ΔP_evap=(P_fuel1)−(P_fuel2). In the present embodiment, steps S1 to S8 shown in FIG. 2 correspond to a first period I shown in (a) of FIG. 4. Then, following step S8, the processing proceeds to step S9 shown in FIG. 3.

Figure 3:
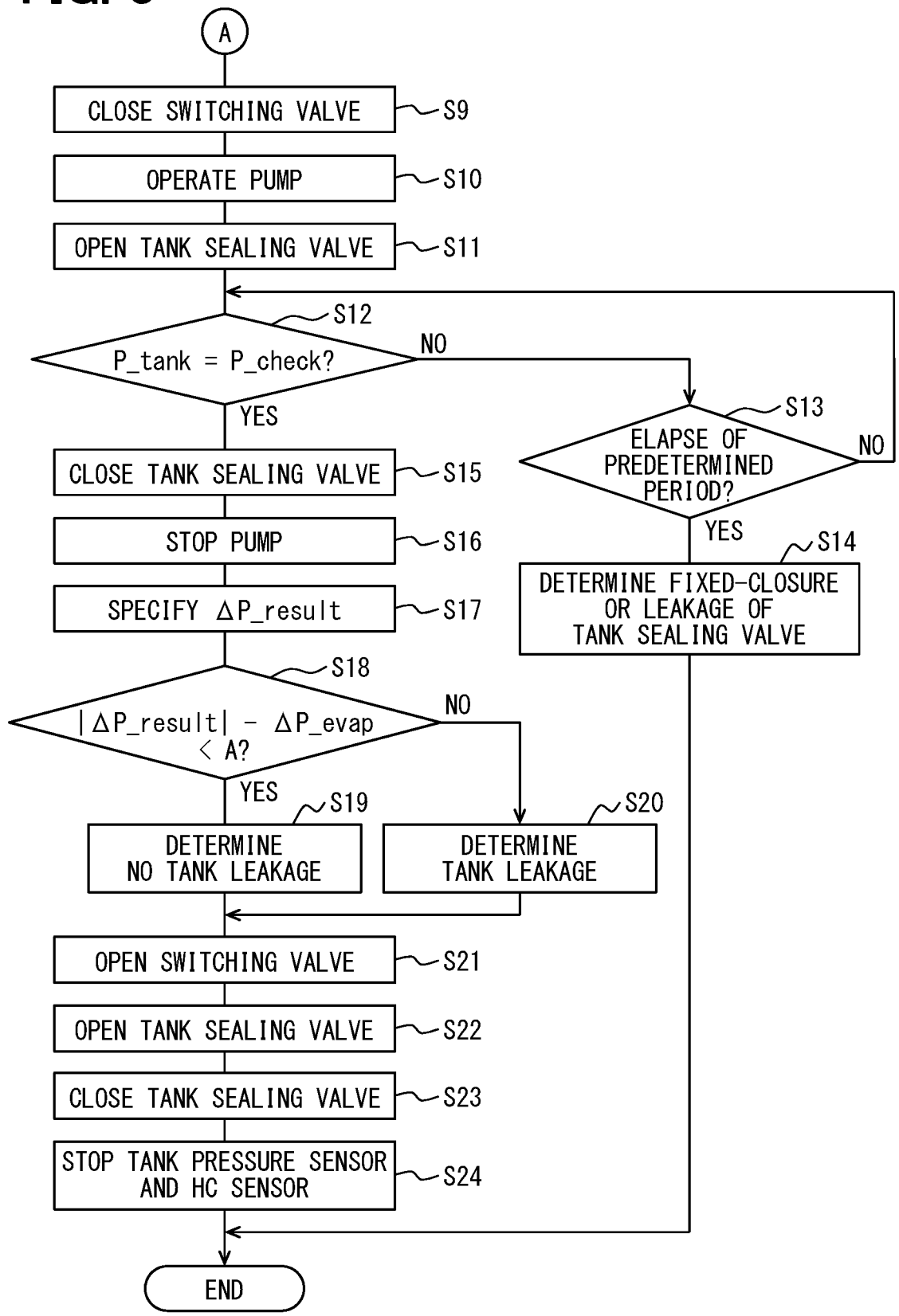
FIG. 3 is a flowchart of the other part of the leakage diagnosis in the first embodiment.

In step S9 shown in FIG. 3, the switching valve 12 is closed. In step S10, the pump 7 is operated. In step S11, the tank sealing valve 4 is opened. In the present embodiment, the pump 7 is a depressurization pump and hence the inside pressure of the diagnosis target system including the fuel tank 2 is decreased. Steps S9 to S11 shown in FIG. 3 correspond to a second period II shown in (a) of FIG. 4. In FIG. 3, the Next, in step S12 shown in FIG. 3, it is checked whether the tank absolute pressure P_tank specified in step S2 is the same as the pressure target value P_check specified in step S6. This checking may be executed by a predetermined program by the ECU 102. When it is determined that the tank absolute pressure P_tank is not the same as the pressure target value P_check, that is, the check result of step S12 is NO, it is further checked in step S13 whether a predetermined period has elapsed since the opening of the tank sealing valve 4. When it is determined in step S13 that the predetermined period has not elapsed yet, that is, the check result in step S13 is NO, step S12 is executed again. On the other hand, when it is determined in step S13 that the predetermined period has elapsed, that is, the check result in step S13 is YES, it is determined in step S14 that the tank sealing valve 4 is fixedly closed or there is a leak in the diagnosis target system including the fuel tank 2.

On the other hand, when it is determined in step S12 that the tank absolute pressure P_tank is the same as the pressure target value P_check, that is, the check result in step S12 is YES, the tank sealing valve 4 is closed in step S15. In step S16, the pump 7 is stopped. Steps S12 to S16 shown in FIG. 3 correspond to a third period III shown in (a) of FIG. 4.

Thereafter, in step S17 shown in FIG. 3, the pressure change amount ΔP_result after the predetermined period has elapsed from the stop of the pump 7 is calculated as the pressure change relation value B by the leakage diagnosis unit 8. The pressure change amount ΔP_result is a difference between the pressure target value P_check and the tank absolute pressure P_tank. In step S18, the leakage diagnosis threshold value A or the pressure change relation value B is corrected by the correction unit 83 based on ΔP_evap as the correction value. Then leakage diagnosis is executed by the leakage diagnosis unit 8. In the present embodiment, the pressure change relationship value B is corrected by subtracting the ΔP_evap as the correction value from the absolute value of the pressure change amount ΔP_result as the pressure change relation value by the correction unit 83. Then, it is checked by the leakage diagnosis unit 8 whether the corrected pressure change relation value B is smaller than ΔP_leak which is the leakage diagnosis threshold value A.

When it is determined in step S18 that the corrected pressure change relation value B is smaller than the leakage diagnosis threshold value A, that is, the check result in step S18 is YES, it is determined in step S19 that there is no leakage in the diagnosis target system. For example, in case that P_tank shown in (g) of FIG. 4 is P_t1, it is determined that there is no leakage in the diagnosis target system when the corrected value of ΔP_r1, which is ΔP_result corresponding to P_t1, that is, |ΔP_r1|−ΔP_evap is smaller than ΔP_leak as the leakage diagnosis threshold A. When there is no large leak hole in the fuel tank 2, the HC concentration d_HC in the fuel tank 2 gradually increases with time, as shown by d_HC1 in (h) of FIG. 4, from the HC concentration d_HC start at the time of immediately after closing the tank sealing valve 4 to the concentration d_HC_end corresponding to the HC saturated vapor pressure.

When it is determined in step S18 that the corrected pressure change relation value B is not smaller than the leakage diagnosis threshold value A, that is, the check result in step S18 is NO, it is determined in step S20 that there is a leakage in the diagnosis target system. For example, in case that P_tank shown in (g) of FIG. 4 is P_t2, it is determined that there is a leakage in the tank 2 when the corrected value of ΔP_r2, which is ΔP_result corresponding to P_t2, that is, |ΔP_r2|−ΔP_evap is equal to or larger than ΔP_leak as the leakage diagnosis threshold A. When the fuel tank 2 has a large leak hole, the HC concentration d_HC in the fuel tank gradually decreases with the inflow of air from the leak hole of the fuel tank 2 as indicated by d_HC2 in (h) of FIG. 4.

After the leakage diagnosis is finished as described with reference to FIG. 3, the switching valve 12 is opened in step S21 and the tank sealing valve 4 is opened in step S22 to make the inside pressure of the diagnosis target system to be equal to the atmospheric pressure. Then, in step S23, the tank sealing valve 4 is closed. Thereafter, in step S24, the tank pressure sensor 110 and the HC sensor 91 are stopped thereby ending the control processing related to the leakage diagnosis processing. Steps S17 to S24 shown in FIG. 3 correspond to a fourth period IV, a fifth period V and a sixth period VI shown in (a) of FIG. 4.

The present embodiment provides the following functions and advantages.

In the evaporative fuel treatment device 1 according to the present embodiment, the corresponding partial pressure specifying unit 81 specifies, based on the relation between the tank absolute pressure P_tank and the first partial pressure P_fuel1, the second partial pressure P_fuel2 that is the partial pressure of the evaporative fuel in the fuel tank 2 when the inside pressure of the fuel tank 2 is regulated by increasing or decreasing the inside pressure to the pressure target value P_check. The comparison unit 82 compares the first partial pressure P_fuel1 and the second partial pressure P_fuel2 of the evaporative fuel. The correction unit 83 corrects, based on the comparison result, the leakage diagnosis threshold value A or the pressure change relation value B which is used for the leakage diagnosis. In the present embodiment, the pressure change relation value B is corrected. Thereby, the leakage diagnosis unit 8 performs the leakage diagnosis in consideration of the state change in the fuel based on the corrected value, so that the accuracy of the leakage diagnosis is improved. In addition, since the temperature of the evaporative fuel is not required in performing the correction, no temperature detection sensor is necessitated, the structure of the diagnosis device is simplified and the manufacturing cost is reduced.

In the present embodiment, the differential pressure specifying unit 5 includes the atmospheric pressure sensor 51 that measures the atmospheric pressure P_atm. The concentration specifying unit 9 includes the HC sensor 91 that measures the hydrocarbon concentration d_HC as the in-tank concentration d_X. The tank absolute pressure specifying unit 10 includes the tank pressure sensor 110 that measures the tank absolute pressure P_tank. The comparison unit 82 calculates, as the comparison result, ΔP_evap which is the difference of the first partial pressure P_fuel1 and the second partial pressure P_fuel2. As a result, the pressure change relation value B is corrected based on ΔP_evap. Since the fuel state change is thus reflected more accurately, the leakage diagnosis can be performed with high accuracy.

In the present embodiment, the pump 7 is a depressurization pump that depressurizes the diagnosis target system, and the pressure target setting unit 6 sets the pressure target value P_check so that the differential pressure ΔP becomes the predetermined differential pressure target value ΔP_target. Then, the leakage diagnosis unit 8 calculates, as the pressure change relation value B, the pressure change amount ΔP_result in the fuel tank 2 for the predetermined period after the tank sealing valve 4 is closed in the state where the pressure in the diagnosis target system is decreased to the pressure target value P_check, and performs the leakage diagnosis based on the pressure change amount ΔP_result and the leakage diagnosis threshold value A. The differential pressure target value ΔP_target is thus the predetermined value and is not changed every time the leakage diagnosis is performed. The pressure change amount ΔP_result is defined to be the pressure change amount caused in the predetermined period from the time of decreasing the pressure to the pressure target value P_check and sealing the fuel tank 2. Therefore, ΔP_leak as the leakage diagnosis threshold value A is set with high accuracy, and correction by the correction unit 83 is performed without using the pressure value during depressurization of the fuel tank 2 that is subject to variations in a free or vacant volume of the fuel tank 2 and pump performance. The leakage diagnosis is thus performed with high accuracy.

Figure 4:
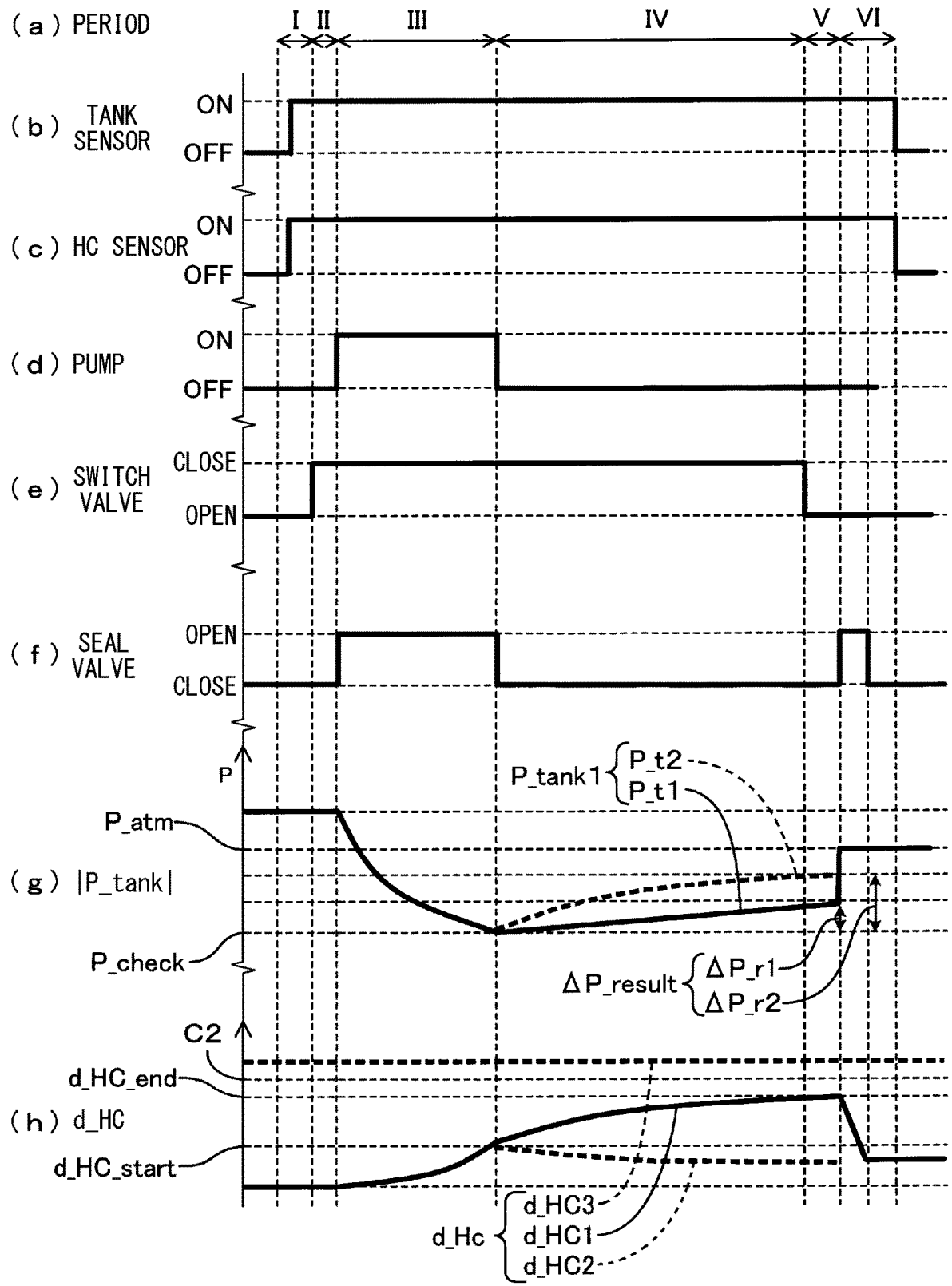
FIG. 4 is a time chart of an operation of the first embodiment.

It is to be noted in the present embodiment that, in case that the HC concentration decreases more than the predetermined value as indicated by d_HC2 in (h) of FIG. 4 after closing the tank sealing valve 4 in step S15 and stopping the pump 7 in step S16 in FIG. 3, it is highly likely that there is a leak hole in the fuel tank 2 and air is flowing in from the leak hole. Therefore, when the HC concentration is decreased by a specified value C4 or more from the HC concentration d_HC_start immediately after closing the tank sealing valve 4 after step S16 shown in FIG. 3, that is, when d_HC≤d_HC_start—C4 is satisfied, a warning light of the vehicle may be turned on with more emphasis on a leakage diagnosis result which is made under a normal state in which d_HC>d_HC_start-C4 is satisfied.

In the present embodiment, the concentration specifying unit 9 includes the HC sensor 91 that detects the HC concentration d_HC. However, instead of or in addition to this, a sensor that detects an ethanol concentration and a methanol concentration may be provided. In this case, even when a mixed fuel of ethanol or methanol is used, the leakage diagnosis can be performed with high accuracy as in the case of the present embodiment.

Further, in the present embodiment, the pressure change amount ΔP_leak in the predetermined period is adopted as the leakage diagnosis threshold value A. Alternatively, the leakage diagnosis threshold value A may be set to the period T_leak required for the tank internal pressure change amount reaches a predetermined value or to the pressure change speed dp/dt_leak in the fuel tank 2. In this case as well, the same advantage as that of the first embodiment is provided.

As described above, according to the present embodiment, it is possible to provide the evaporative fuel treatment device capable of performing the leakage diagnosis with high accuracy.

Second Embodiment

Figure 5:
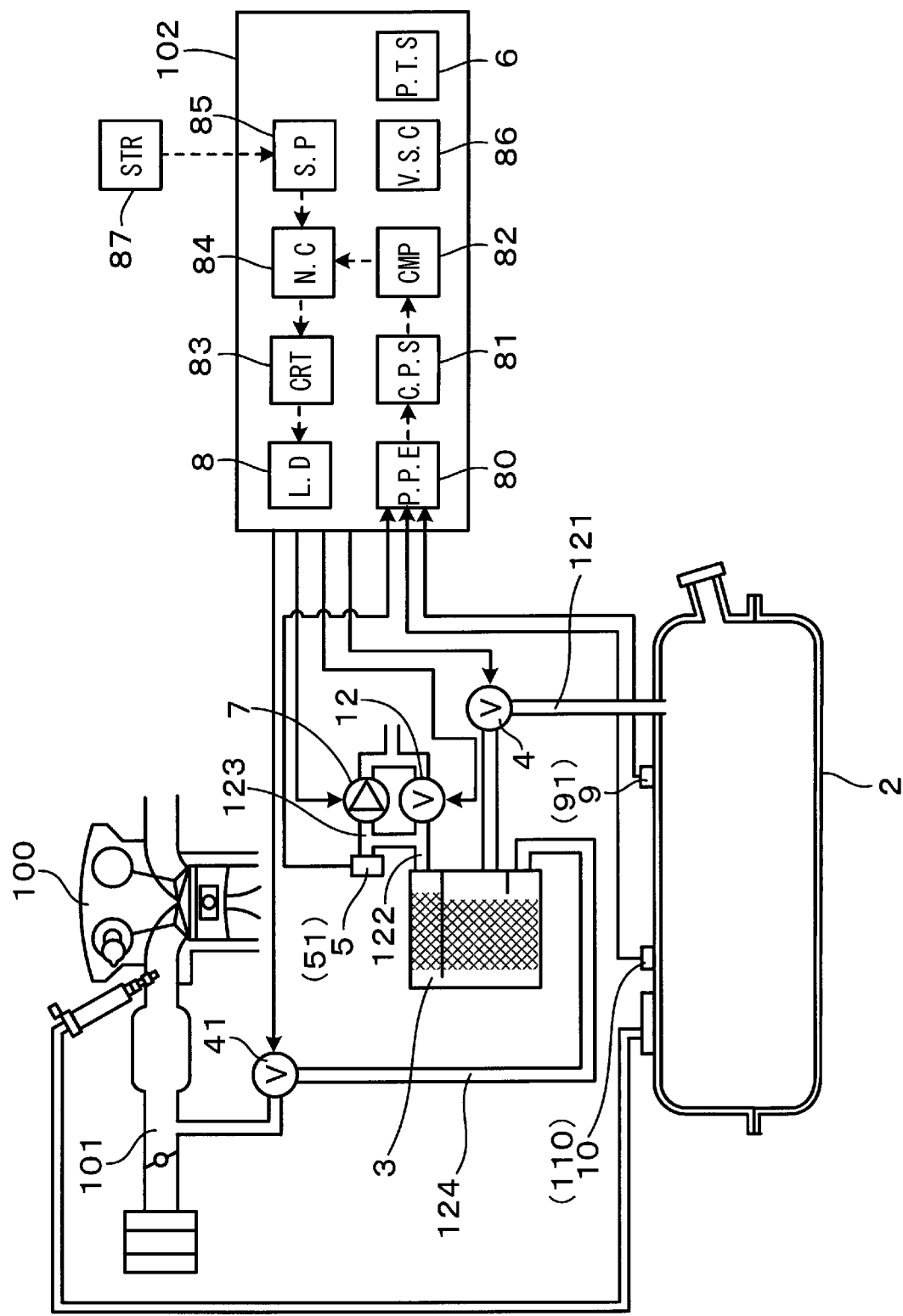
FIG. 5 is a schematic view showing a configuration of an evaporative fuel treatment device according to a second embodiment.

As shown in FIG. 5, the evaporative fuel treatment device of the present embodiment has a necessity check unit (N.C) 84, a statistic processing unit (S. P) 85, a valve state check (V.S.C) unit 86 and a storage unit (STR) 87 in addition to the configuration of the first embodiment shown in FIG. 1. The necessity check unit 84 checks whether the diagnosis by the leakage diagnosis unit 8 is necessary or whether the correction by the correction unit 83 is necessary. The statistic processing unit 85 statisticly processes the result of the leakage diagnosis. The valve state check unit 86 checks an operation state of the tank sealing valve 4. The statistic processing unit 85 and the valve state check unit 86 perform respective functions by execution of predetermined programs by the processor such as a microcomputer provided in the ECU 102. The storage unit 87 stores leak flag information described later. The storage unit 87 is a rewritable nonvolatile memory which may be provided in the ECU 2.

The leakage diagnosis of the present embodiment will be described below with reference to a flowchart shown in FIG. 6.

Figure 6:
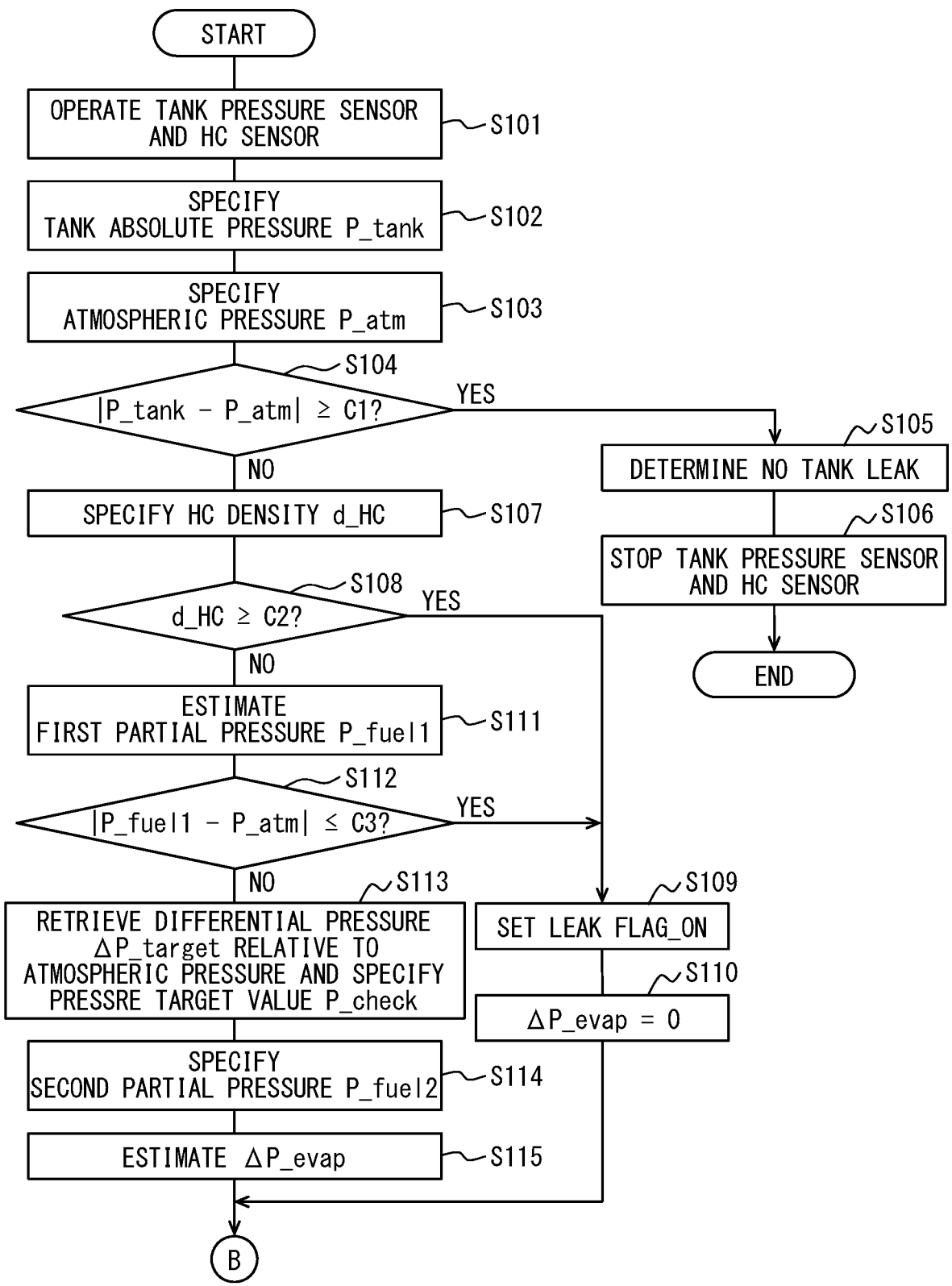
FIG. 6 is a flowchart of a part of a leakage diagnosis in the second embodiment.

First, in step S101 shown in FIG. 6, the HC sensor 91 and the tank pressure sensor 110 are operated. In step S102, the tank absolute pressure P_tank in the tank is specified by the tank pressure sensor 110. In step S103, the atmospheric pressure P_atm is specified by the atmospheric pressure sensor 51.

Subsequently, in step S104, it is checked by the leakage diagnosis unit 8 whether the absolute value of the difference between the tank absolute pressure P_tank and the atmospheric pressure P_atm is equal to or larger than a predetermined value C1. When it is determined in step S104 that the absolute value of the difference between the tank absolute pressure P_tank and the atmospheric pressure P_atm is equal to or larger than the predetermined value C1, that is the check result in step S104 is YES, it is determined in step S105 by the leakage diagnosis unit 8 that there is no leakage. Thereafter, in step S106, the tank pressure sensor 110 and the HC sensor 91 are stopped thereby ending the control processing.

On the other hand, when it is determined in step S104 that the absolute value of the difference between the tank absolute pressure P_tank and the atmospheric pressure P_atm is not larger than the predetermined specified value C1, that is, the check result in step S104 is NO, the HC concentration d_HC in the fuel tank 2 is specified in step S107 by the HC sensor 91.

In step S108, it is checked by the necessity check unit 84 whether the HC concentration d_HC is equal to or larger than the predetermined specified value C2. When the HC concentration d_HC is equal to or larger than the predetermined specified value C2 as indicated by d_HC3 in (h) of FIG. 4, the check result in step S108 is YES. In step S109, a leak flag is set to ON by the necessity check unit 84 and stored in the storage unit 87 as the leak flag information. Then, in step S110, the correction value ΔP_evap, which is the comparison result of the comparison unit 82, to 0 by the necessity check unit 84, so that the correction by the correction unit 83 is unnecessary. Thereafter, the processing proceeds to step S116 shown in FIG. 7 described later in detail. Although not shown, in step S110, it may be determined to stop the leakage diagnosis performed by the leakage diagnosis unit 8 instead of setting the value of ΔP_evap to 0 by the necessity check unit 84.

On the other hand, when it is determined in step S108 shown in FIG. 6 that the HC concentration d_HC is not equal to or larger than the predetermined specified value C2, as indicated by d_HC1 in (h) of FIG. 4, that is, the check result in S108 is NO, the first partial pressure P_fuel1 is estimated by the partial pressure estimation unit 80. Thereafter, in step S112, it is checked by the necessity check unit 84 whether the absolute value of the difference between the first partial pressure P_fuel1 and the atmospheric pressure P_atm is equal to or smaller than a predetermined specified value C3. When it is determined in step S112 that the absolute value of the difference between the first partial pressure P_fuel1 and the atmospheric pressure P_atm is equal to or smaller than the predetermined specified value C3, that is, the check result in S112 is YES, the above-described steps S109 and S110 and subsequent steps shown in FIG. 7 are executed.

When it is determined in step S112 that the absolute value of the difference between the first partial pressure P_fuel1 and the atmospheric pressure P_atm is not equal to or smaller than the predetermined value C3, the check result in step S112 is NO. Then, similarly to steps S6 to S8 of the first embodiment shown in FIG. 2, the differential pressure target value ΔP_target preset in step S113 is retrieved and the pressure target value P_check is specified from the retrieved value ΔP_target and the atmospheric pressure P_atm. In S114, the second partial pressure P_fuel2 of the evaporative fuel is specified, and in step S115 the correction value ΔP_evap is estimated. Thereafter, the processing proceeds to step S116 shown in FIG. 7.

Steps S116 to S120 shown in FIG. 7 are the same as steps S9 to S13 of the first embodiment shown in FIG. 3. That is, the switching valve 12 is closed in step S116, the pump 7 is operated in step S117, the tank sealing valve 4 is opened in step S118, and it is checked in step S119 whether the absolute value of the tank absolute pressure P_tank is the same as the pressure target value P_check. When it is determined in step S119 that the tank absolute pressure P_tank is not the same as the target pressure value P_check, that is, the check result in step S119 is NO, it is checked in step S120 whether a predetermined period has elapsed. When it is determined in step S120 that the predetermined period has not elapsed yet, that is, the check result in step S120 is NO, step S119 is executed again.

On the other hand, when it is determined in step S120 shown in FIG. 7 that the predetermined period has elapsed, that is, the check result in step S120 is YES, it is started to check in step S121 by the valve state check unit 86 whether the operation state of the tank sealing valve 4 is normal thereby diagnosing fixed closure of the tank sealing valve. This checking may be made, for example, based on a presence or absence of a change in the internal pressure of the fuel tank 2 after transmission of a signal for opening the tank sealing valve 4 after the tank sealing valve 4 is closed with the pump 7 stopped to cause a pressure difference between the inside and the outside of the fuel tank 2. Specifically, for example, it may be checked whether the pressure inside the fuel tank 2 becomes negative when a signal for maintaining the tank sealing valve 4 to be open under a state that the purge valve 41 is opened and the switching valve 12 is maintained in the closed state for canister purge processing during the engine operation.

Thereafter, when it is determined in step S122 that the tank sealing valve 4 is normal, that is, the check result in step S122 is YES, it is determined in step S123 that there is a leak in the fuel tank 2. The processing thus ends after executing a finishing step S134.

On the other hand, when it is determined in step S122 that the tank sealing valve 4 is not normal, that is, the check result in step S122 is NO, it is determined in step S124 that the tank sealing valve 4 is fixedly closed. In this case, finishing processing is executed in step S134.

When it is determined in step S119 that the tank absolute pressure P_tank is the same as the pressure target value P_check, that is, the check result in step S119 is YES, the tank sealing valve 4 is closed in step S125 and the pump 7 is stopped in step S126.

Thereafter, in step S127, ΔP_result is specified as the pressure change relation value B by the leakage diagnosis unit 8, as in step S17 of the first embodiment shown in FIG. 3. In next step S128, |ΔP_result|–ΔP_evap is calculated and the pressure change relation value B is corrected in step S128 by the correction unit 83. Next, in step S129, it is checked by the statistic processing unit 85 whether the leak flag stored in the storage unit 87 is ON.

When it is determined in step S129 that the leak flag is ON, that is, the correction value ΔP_evap=0 and the pressure change relation value B is not corrected, the check result in step S129 is YES. In step S130, a predetermined weighting processing is executed on the value of |ΔP_result|–ΔP_evap, which is the current result, by the correction unit 83. The weighting processing makes it easy to check whether the leakage is present by the leakage diagnosis unit 8. In step S131, the statistic result is output by statistically processing the leak information collected so far by the statistic processing unit 85. As the leak information collected so far for calculating the statistic result, the latest leak information or the latest plural leak information may be used. In the present embodiment, |ΔP_result|–ΔP_evap is calculated by the leakage diagnosis unit 8 in step S128. Alternatively, |ΔP_result|–ΔP_evap–ΔP_leak may be calculated. In this case, when |ΔP_result|–ΔP_evap–ΔP_leak is smaller than 0, the statistic processing may be executed by treating |ΔP_result|–ΔP_evap–ΔP_leak is 0.

After step S131 shown in FIG. 7, it is checked in step S132 by the leakage diagnosis unit 8 whether the statistic result calculated in step S131 is equal to or larger than the predetermined leakage diagnosis threshold value A which is set as the leak reference value. When it is determined in step S132 that the statistic result exceeds the leak reference value, that is, the check result in step S132 is YES, it is determined in step S133 that the fuel tank 2 has a leak. Thereafter, the finishing processing is executed in step S134. This finishing processing is the same as steps S21 to S24 in the first embodiment shown in FIG. 3. When it is determined in step S132 that the statistic result is smaller than the leakage reference value, that is, the check result in step S132 is NO, the finishing processing is executed in step S134.

On the other hand, when it is determined in step S129 that the leak flag is not ON, step S131 and subsequent steps are executed without executing step S130.

The operation and advantage of the present embodiment will be described in detail below.

In the present embodiment, the necessity check unit 84 checks whether the leakage diagnosis is necessary or whether the correction is necessary based on the comparison result output by comparing the concentration d_HC specified by the concentration specifying unit 9 with the predetermined specified value C2. When the HC concentration d_HC is close to 100%, there is a high possibility that there is a leak hole in the fuel tank 2 and air is pushed out from the leak hole and the concentration is high. As a result, it is likely that the partial pressure of the fuel gas is not a value equivalent to the saturated vapor pressure of the fuel gas at the time of leakage diagnosis, and that the influence of the evaporative fuel may not be accurately predicted. Therefore, it is possible to improve the accuracy of the leakage diagnosis by checking the necessity of the leakage diagnosis or the necessity of the correction based on the comparison result between the HC concentration d_HC and the predetermined specified value C2.

In the present embodiment, the necessity check unit 84 determines that the leakage diagnosis by the leakage diagnosis unit 8 is to be stopped or the correction by the correction unit 83 is stopped when the concentration d_HC is equal to or larger than the predetermined specified value C2. If the diagnosis target system including the fuel tank 2 is almost in the closed state, air always exists in the diagnosis target system and the HC concentration d_HC should not exceed the predetermined value. Therefore, when the concentration d_HC is equal to or larger than the predetermined specified value C2, it is possible to improve the accuracy of the leakage diagnosis by determining that the leakage diagnosis by the leakage diagnosis unit 8 is to be stopped or determining that the correction is to be stopped. In the present embodiment, when the concentration d_HC is equal to or larger than the predetermined specified value C2, it is determined that there is a possibility that the fuel tank 2 has a leak, and the leak flag is set to ON.

Moreover, in the present embodiment, the necessity check unit 84 checks whether the leakage diagnosis or the correction is necessary based on the comparison result output by the comparison of the difference ΔP_fuel between the P_fuel of the first partial pressure P_fuel1 and the atmospheric pressure P_atm with the predetermined specified value C3. When the partial pressure of the fuel gas is the same as or close to the atmospheric pressure P_atm at that time, there is a high possibility that the fuel tank 2 has a leak hole and the tank internal pressure leaks through the leak hole. As a result, it is likely that the partial pressure P_fuel of the fuel gas is not a value equivalent to the saturated vapor pressure of the fuel gas at the time of leakage diagnosis, and that the influence of the evaporative fuel may not be accurately predicted. Therefore, it is possible to improve the accuracy of the leakage diagnosis by checking the necessity of the leakage diagnosis or the necessity of the correction based on the comparison result between the difference ΔP_fuel and the predetermined specified value C3.

In the present embodiment, when the absolute value of the difference ΔP_fuel is equal to or smaller than the predetermined specific value C3, the necessity check unit 84 determines that the leakage diagnosis by the leakage diagnosis unit 8 is to be stopped or the correction by the correction unit 83 is to be stopped. Even in a state where the partial pressure of the evaporative fuel in the fuel tank 2 becomes equal to or higher than the atmospheric pressure P_atm, the partial pressure should not exceed the atmospheric pressure if the fuel tank 2 has a leak hole. Thereby, when the absolute value of the difference ΔP_fuel is equal to or smaller than the predetermined specified value C3, it is possible to improve the accuracy of the leakage diagnosis by determining that the leakage diagnosis or correction is stopped.

In the second embodiment, the processing proceeds to step S116 shown in FIG. 7 following steps S115 and S110 shown in FIG. 6. Alternatively, the processing may proceed to step S9 shown in FIG. 3 of the first embodiment following steps S115 and S110 shown in FIG. 6. In this case, step S109 in FIG. 6 may not be executed.

The leakage diagnosis device according to the present disclosure is not limited to the disclosed embodiments and modifications described above but may be implemented differently.

What is claimed is:

1. An evaporative fuel treatment device for restoring evaporative fuel, the evaporative fuel treatment device comprising:
   a fuel tank that stores fuel of an internal combustion engine;
   a canister that adsorbs evaporative fuel evaporated in the fuel tank;
   a tank sealing valve that switches between allowing and blocking communication between the fuel tank and the canister;
   a differential pressure specifying unit that specifies a differential pressure between an inside pressure of a diagnosis target system including the fuel tank an atmospheric pressure;
   a pressure target setting unit that sets a pressure target value in the diagnosis target system so that the differential pressure becomes a predetermined differential pressure target value;
   a pump that pressurizes or depressurizes a pressure in the diagnosis target system to the pressure target value;
   a leakage diagnosis unit that performs a leakage diagnosis in the diagnosis target system based on a pressure change relation value, which is related to a pressure change in the diagnosis target system, and a predetermined leakage diagnosis threshold value;
   a concentration specifying unit configured to specify an in-tank concentration of a specific component in a gas phase portion in the fuel tank;
   a tank absolute pressure specifying unit configured to specify a tank absolute pressure that is an absolute pressure in the fuel tank;
   a fuel partial pressure estimation unit configured to estimate a first partial pressure of fuel vapor in the fuel tank based on the in-tank concentration and the tank absolute pressure;
   a corresponding partial pressure specifying unit configured to specify, based on a relation between the tank absolute pressure and the first partial pressure, a second partial pressure of the fuel vapor in the fuel tank when the tank pressure of the fuel tank is increased or decreased to the pressure target value;
   a comparison unit provided for comparing the first partial pressure and the second partial pressure; and
   a correction unit configured to correct, based on a comparison result of the comparison unit, the leakage diagnosis threshold value or the pressure change relation value used for the leakage diagnosis.

2. The evaporative fuel treatment device according to claim 1, wherein:

the differential pressure specifying unit includes an atmospheric pressure sensor for measuring the atmospheric pressure;

the concentration specifying unit includes an HC sensor that measures a hydrocarbon concentration as the in-tank concentration;

the tank absolute pressure specifying unit includes a tank pressure sensor for measuring the tank absolute pressure; and the comparison unit calculates a difference between the first partial pressure and the second partial pressure as the comparison result.

3. The evaporative fuel treatment device according to claim 1, wherein:

the pump is a depressurizing pump that decreases a pressure in the diagnosis target system;

the pressure target setting unit sets the pressure target value so that the differential pressure becomes the predetermined differential pressure target value; and the leakage diagnosis unit is configured to calculate a pressure change amount in the fuel tank in a predetermined period after the tank sealing valve is closed in a state where the pressure in the diagnosis target system is decreased to the pressure target value as the pressure change relation value, and executes the leakage diagnosis based on the comparison result indicating a result of comparison between the pressure change amount and the leakage diagnosis threshold value.

4. The evaporative fuel treatment device according to claim 3, further comprising:

a necessity check unit configured to check, based on a comparison result of a comparison between the in-tank concentration and a predetermined specified value, whether the leakage diagnosis is necessary or the correction is necessary.

5. The evaporative fuel treatment device according to claim 4, wherein:

the necessity check unit determines, when the in-tank concentration is equal to or larger than the predetermined specified value, that the leakage diagnosis by the leakage diagnosis unit is to be stopped or the correction by the correction unit is to be stopped.

6. The evaporative fuel treatment device according to claim 3, further comprising:

a necessity check unit configured to check, based on the comparison result of the comparison between the differential pressure, which is between the first partial pressure and the atmospheric pressure, and a predetermined specified value, whether the leakage diagnosis is necessary or the correction is necessary.

7. The evaporative fuel treatment device according to claim 6, wherein:

the necessity check unit is configured to determine, when an absolute value of the differential pressure is equal to or smaller than a predetermined specified value, that the leakage diagnosis by the leakage diagnosis unit is to be stopped or the correction by the correction unit is to be stopped.

8. A leakage diagnosis device for an evaporative fuel treatment device, which includes a fuel tank that stores fuel of an internal combustion engine, a canister that adsorbs evaporative fuel evaporated in the fuel tank, a tank sealing valve that switches between allowing and blocking communication between the fuel tank and the canister, and a pump that regulates a pressure in a diagnosis target system including the fuel tank to a pressure target value, the leakage diagnosis device comprising:

an electronic control unit configured to perform a leakage diagnosis in the diagnosis target system based on a pressure change relation value, which is related to a pressure change in the diagnosis target system, and a predetermined leakage diagnosis threshold value, wherein the electronic control unit is configured to execute processing of:

estimating a first partial pressure of fuel vapor generated in the fuel tank based on an in-tank concentration of a specific component in a gas phase portion in the fuel tank and a tank absolute pressure that is an absolute pressure in the fuel tank;

specifying, based on a relation between the tank absolute pressure and the first partial pressure, a second partial pressure of the fuel vapor generated in the fuel tank when the tank pressure of the fuel tank is regulated to a pressure target value by the pump;

comparing the first partial pressure and the second partial pressure;

correcting, based on a comparison result of the first partial pressure and the second partial pressure, a leakage diagnosis threshold value or a pressure change relation value used for the leakage diagnosis.

9. The leakage diagnosis device for an evaporative fuel treatment device according to claim 8, wherein the electronic control unit is further configured to execute processing of:

acquiring an atmospheric pressure from an atmospheric pressure sensor;

acquiring a hydrocarbon concentration as the in-tank concentration in estimating the first partial pressure from an HC sensor;

acquiring the tank absolute pressure from a tank pressure sensor which measures the tank absolute pressure; and calculating a difference between the first partial pressure and the second partial pressure as the comparison result.

10. The leakage diagnosis device for an evaporative fuel treatment device according to claim 8, wherein the electronic control unit is configured to execute processing of:

setting the pressure target value so that a differential pressure between a pressure in the diagnosis target system and the atmospheric pressure becomes a predetermined differential pressure target value; and calculating a pressure change amount in the fuel tank in a predetermined period after the tank sealing valve is closed in a state where the pressure in the diagnosis target system is regulated to the pressure target value as the pressure change relation value; and executing the leakage diagnosis based on the comparison result indicating a result of comparison between the pressure change amount and the leakage diagnosis threshold value.

11. The leakage diagnosis device for an evaporative fuel treatment device according to claim 10, wherein the electronic control unit is configured to execute further processing of:

checking, based on the comparison result of a comparison between the in-tank concentration and a predetermined specified value, whether the leakage diagnosis is necessary or the correction is necessary.

12. The leakage diagnosis device for an evaporative fuel treatment device according to claim 11, wherein the electronic control unit is configured to execute further processing of:

determining that the leakage diagnosis is to be stopped or the correction by the correction unit is to be stopped when the in-tank concentration is equal to or larger than the predetermined specified value.

13. The leakage diagnosis device for an evaporative fuel treatment device according to claim 10, wherein the electronic control unit is configured to execute further processing of:

checking, based on a comparison result of the comparison between the differential pressure, which is between the first partial pressure and the atmospheric pressure, and a predetermined specified value, whether the leakage diagnosis is necessary or the correction is necessary.

14. The leakage diagnosis device for an evaporative fuel treatment device according to claim 13, wherein the electronic control unit is configured to execute further processing of:

determining, when an absolute value of the differential pressure is equal to or smaller than a predetermined specified value, that the leakage diagnosis is to be stopped or the correction by the correction unit is to be stopped.

* * * * *